United States Patent
Agrawal et al.

(10) Patent No.: US 10,778,353 B2
(45) Date of Patent: Sep. 15, 2020

(54) PROVIDING REAL-TIME AUDIENCE AWARENESS TO SPEAKER

(71) Applicant: International Business Machines Corporation, Armonk, NY (US)

(72) Inventors: Bhavna Agrawal, Armonk, NY (US); Ruchi Mahindru, Elmsford, NY (US); Karin Murthy, Danbury, CT (US); Sharon M. Trewin, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/256,241

(22) Filed: Jan. 24, 2019

(65) Prior Publication Data
US 2020/0244380 A1    Jul. 30, 2020

(51) Int. Cl.
| | | |
|---|---|---|
| H04H 60/33 | (2008.01) | |
| G10L 15/00 | (2013.01) | |
| G06F 9/54 | (2006.01) | |
| G06F 9/451 | (2018.01) | |
| G06F 3/0482 | (2013.01) | |

(52) U.S. Cl.
CPC .......... *H04H 60/33* (2013.01); *G06F 3/0482* (2013.01); *G06F 9/453* (2018.02); *G06F 9/542* (2013.01); *G10L 15/005* (2013.01)

(58) Field of Classification Search
None
See application file for complete search history.

(56) References Cited

U.S. PATENT DOCUMENTS

| | | | |
|---|---|---|---|
| 6,124,531 A | 9/2000 | Fullerton | |
| 6,134,531 A | 10/2000 | Trewitt et al. | |
| 8,458,034 B2 | 6/2013 | Toebes et al. | |
| 8,875,008 B2 | 10/2014 | Yuniardi | |
| 9,137,558 B2 | 9/2015 | Gibbon et al. | |
| 9,167,298 B2 | 10/2015 | Lee et al. | |
| 9,326,034 B2 | 4/2016 | Mears et al. | |
| 9,582,808 B2 | 2/2017 | Bhogal et al. | |
| 2008/0282286 A1 | 11/2008 | Or | |
| 2009/0143695 A1* | 6/2009 | Mullen | A61B 5/165 600/544 |

(Continued)

OTHER PUBLICATIONS

Andeweg et al. "Watch yourself! Giving feedback on recorded presentations in a Virtual learning Environment" Institute for Technology and Communication, Delft University of Technology (2005) (9 pages).

(Continued)

*Primary Examiner* — Mohammed Rachedine
(74) *Attorney, Agent, or Firm* — Cantor Colburn, LLP; Anthony Curro

(57) ABSTRACT

Providing real-time awareness of an audience to a presenter during the presentation. In response to presenting a presentation to an audience, information is automatically collected about the audience from sensors positioned amongst the audience. The collected information about the audience is analyzed and, during the presentation, recommendations are made to the presenter for improving the presentation based on the collected information.

20 Claims, 5 Drawing Sheets

Computer/Processing System 100

(56) References Cited

U.S. PATENT DOCUMENTS

| | | | |
|---|---|---|---|
| 2011/0086618 A1* | 4/2011 | DeGrazia | H04L 65/4015 |
| | | | 455/414.1 |
| 2015/0222577 A1 | 8/2015 | Weir | |
| 2016/0015307 A1 | 1/2016 | Kothuri | |
| 2016/0117704 A1 | 4/2016 | Kumaresan Nair | |
| 2016/0321704 A1 | 11/2016 | Elgebeely et al. | |
| 2017/0070305 A1 | 3/2017 | Bowden et al. | |
| 2017/0295404 A1* | 10/2017 | Meredith | H04H 60/66 |
| 2019/0065610 A1* | 2/2019 | Singh | G06F 16/9535 |

OTHER PUBLICATIONS

Rivera-Pelayo et al. "Live interest meter: learning from quantified feedback in mass lectures" Proceedings of the third international conference on learning analytics and knowledge, (Apr. 2013) pp. 23-27.

Saket et al. "Talkzones: Section-based time support for presentations" Proceedings of the 16th international conference on Human-computer interaction with mobile devices & services, (Sep. 2014) pp. 263-272.

Teevan et al. "Displaying mobile feedback during a presentation" Proceedings of the 14th international conference on Human-computer interaction with mobile devices and services, (Sep. 2012) pp. 379-382.

Knutas et al.; "Implementation of an Embedded Mobile Device Based Feedback System for Real-Time Audience Feedback"; Lappeenranta University of Technology; 2013; 21 Pages.

Markopoulos; "Awareness Systems and the Role of Social Intelligence"; AI & Soc; vol. 24; 2009; pp. 115-122.

Tam; "The Design and Field Observation of a Haptic Notification System for Timing Awareness During Oral Presentations"; The University of British Columbia; Oct. 2012; 120 Pages.

\* cited by examiner

PROVIDING REAL-TIME AUDIENCE AWARENESS TO SPEAKER

BACKGROUND

The invention relates generally to improving a speaker's performance while making a presentation and, more particularly, relates to improving the speaker's awareness of the audience during the presentation.

Some people make a living speaking professionally while others only speak occasionally. In either case, the speaker is not sufficiently aware of who is in the audience or what is occurring in the audience during a presentation. The audience may include guests with unique skills or information. Moreover, members of the audience may have needs that the speaker would want to be aware of. What is needed is improved real-time feedback to the speaker about the audience during the presentation so that the speaker can connect better with the audience.

SUMMARY

According to a non-limiting embodiment, a method for providing real-time awareness to a presenter is provided. The method includes presenting a presentation to a plurality of members of an audience and, in response to presenting the presentation, collecting information about the audience from at least one sensor amongst the audience. The method also includes analyzing at least a portion of the information collected about the audience and, during the presentation, making at least one recommendation to the presenter for improving the presentation based on the collected information.

According to another non-limiting embodiment, a system for providing real-time awareness to a presenter is provided. The system includes a processor coupled to a memory unit, wherein the processor is configured to execute program instructions. The program instructions include presenting a presentation to a plurality of members of an audience and, in response to presenting the presentation, collecting information about the audience from a plurality of sensors positioned amongst the audience. The program instructions also include analyzing at least a portion of the information collected about the audience and, during the presentation, making at least one recommendation to the presenter for improving the presentation based on the collected information. The program instructions also include adjusting, via the presenter, the presentation based on the at least one recommendation.

According to yet another non-limiting embodiment, a computer program product is provided. The computer program product includes a computer readable storage medium having program instructions embodied therewith, the program instructions executable by a computer processor to cause the computer processor to perform a method for providing real-time awareness to a presenter. The method includes presenting a presentation to a plurality of members of an audience and, in response to presenting the presentation, collecting information about the audience from at least one sensor amongst the audience. The method also includes analyzing at least a portion of the information collected about the audience and, during the presentation, making at least one recommendation to the presenter for improving the presentation based on the collected information. The method also includes adjusting the presentation based on the at least one recommendation.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

Figure 1:
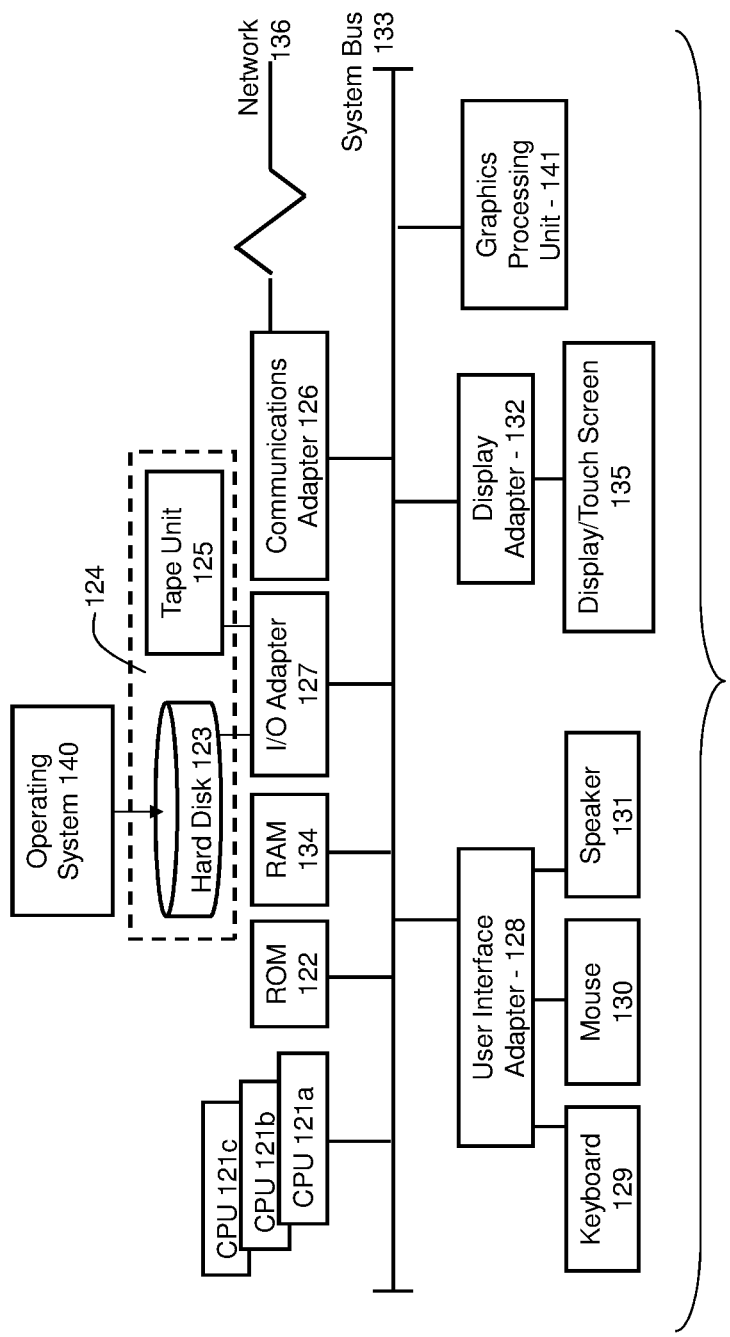
FIG. 1 depicts a block diagram illustrating an exemplary computer system that may be utilized to implement one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system, commonly referred to as a computer device or system 100, for implementing the teachings herein. In one or more embodiments, the computer system 100 is a portable computer system 100 such as a laptop or a mobile device such as a personal digital assistant (PDA) or a phone. The computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124.

Operating system 140 for execution on the processing system 100 may be stored in mass storage 124. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. The computer system 100 also includes a display/touch screen 135. The display/touch screen 135 is an input device where a user can interact directly with what is displayed by giving input by touching the touch screen with one or more fingers or with a stylus. In one or more embodiments, the display/touch screen 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 124, input means such as keyboard 129, mouse 130 and display/touch screen 135, and output capability including speaker 131 and display/touch screen 135. In one embodiment, a portion of RAM 134 and mass storage 124 collectively store the operating system to coordinate the functions of the various components shown in FIG. 1.

Figure 2:
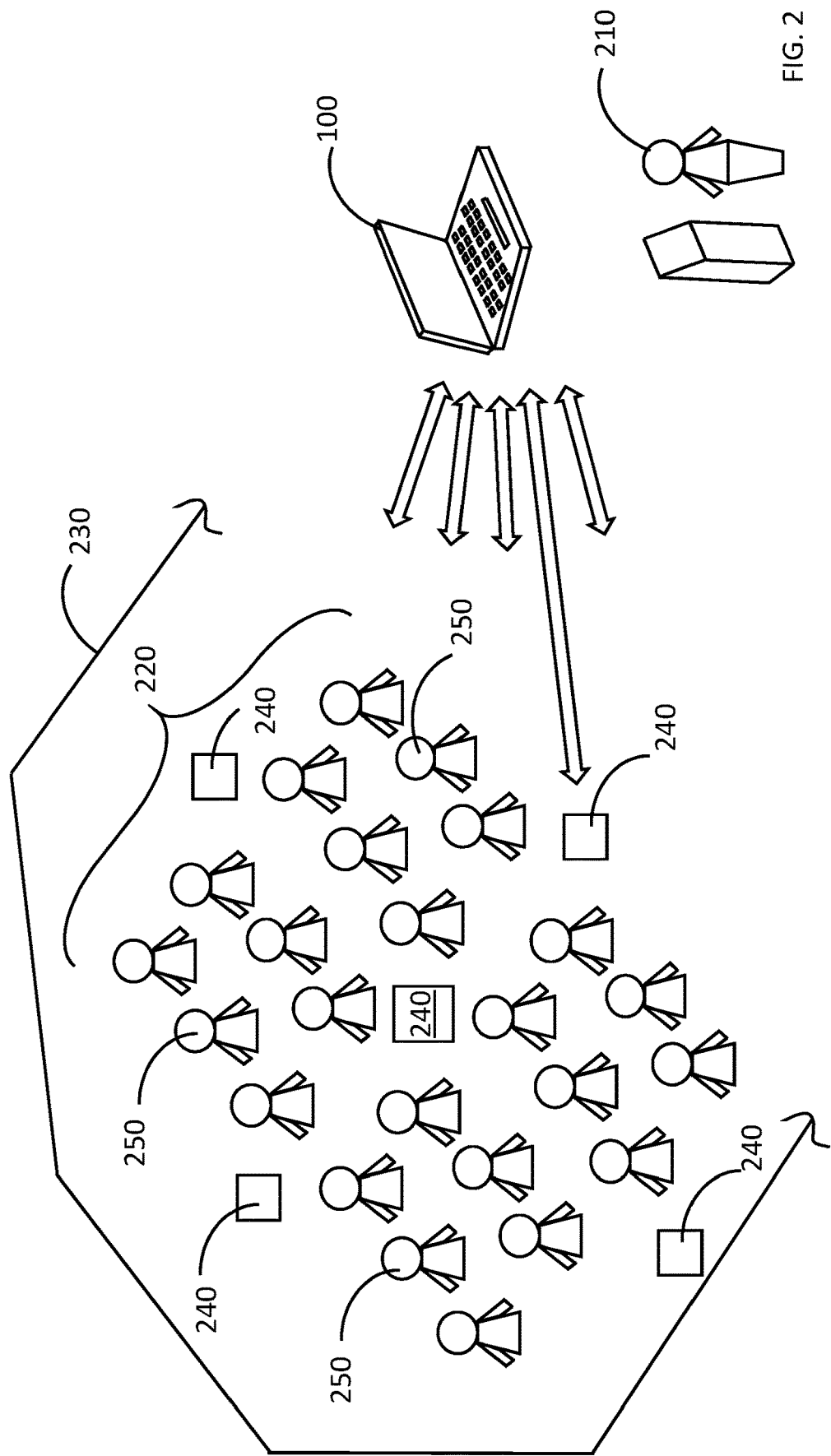
FIG. 2 depicts a presenter presenting a presentation via the computer system to an audience according to one or more embodiments of the present invention.

FIG. 2 is an exemplary embodiment of a speaker or presenter 210 presenting a presentation via the computer system 100 to an audience 220 according to one or more embodiments of the present invention. The audience 220 can be in any environment along with the presenter 210 such as a location or room 230 or the audience may be in a location or environment, suitable for making a presentation, remote from the presenter.

Still referring to FIG. 2, a plurality of sensors 240 are positioned in proximity of or amongst members 250 of the audience 220. The sensors 240 may be any type of sensor capable of collecting information about one or more members 250 of the audience 220 or about the environment such as the room 230. Thus, the sensors 240 collect different types of information about the audience 220 such as for example, audience profiles, real-time audience reactions and behaviors, and a presentation context, as described in greater detail below. Preferably, the sensors 240 automatically detect and transmit information to the computer system 100. In one embodiment, the computer system 100 itself may include one or more sensors 240.

Real-time audience reactions and behaviors can be collected by different types of sensors such as audio sensors, video sensors, and by real/virtual buttons where members 250 of the audience 220 push or select a button to make the presenter 210 aware of particular information. For example, one or more of the sensors 240 may be a microphone capable of detecting audio such as background noise, audience members' voices, movement sounds, languages spoken, coverage of the speaker's voice, and speaker's speech rate.

Also, for example, one or more of the sensors 240 may be a camera or video recorder for detecting and recording images of the members of the audience. The images can be used with a facial identification or recognition application stored on the computing system 100 or accessible via the computing system 100. Also, images provided by one or more of the sensors 240 may also be compared and analyzed to determine a behavior of one or more members 250 of the audience 220. For example, the facial identification or recognition application could be used to determine changes in behavior of audience members 250 during the presentation. Video cameras can also be used to detect physical activity, people talking, and automatic detection of accessibility needs such as when someone walks in with a cane or guide dog, people using sign language, and physical acknowledgments such as nodding.

In one or more embodiments, one or more of the sensors 240 may be a wireless router receiving a wireless signal from computing devices of members 250 of the audience 220. Also, one or more sensors 240 could count the number of people in the room. For example, a sensor 240 could detect when a member enters and/or leaves the room 230. In one or more other embodiments, the sensors 240 could detect social networking information from the computing devices of members 250 of the audience 220. In such case, an occupation or area of expertise can be determined from the social networking information collected by the sensors and provided to the computing system 100 of the presenter 210.

In one or more embodiments, at least one sensor 240 may be capable of detecting the presentation context such as information about an environment or the room 230 where the presentation is made. For example, the sensor 240 can detect a time of day, a temperature, or the amount of light in the room 230. Also, one or more of the sensors 240 can detect the size of the room 230 and also movements of members 250 of the audience 220.

Figure 3:
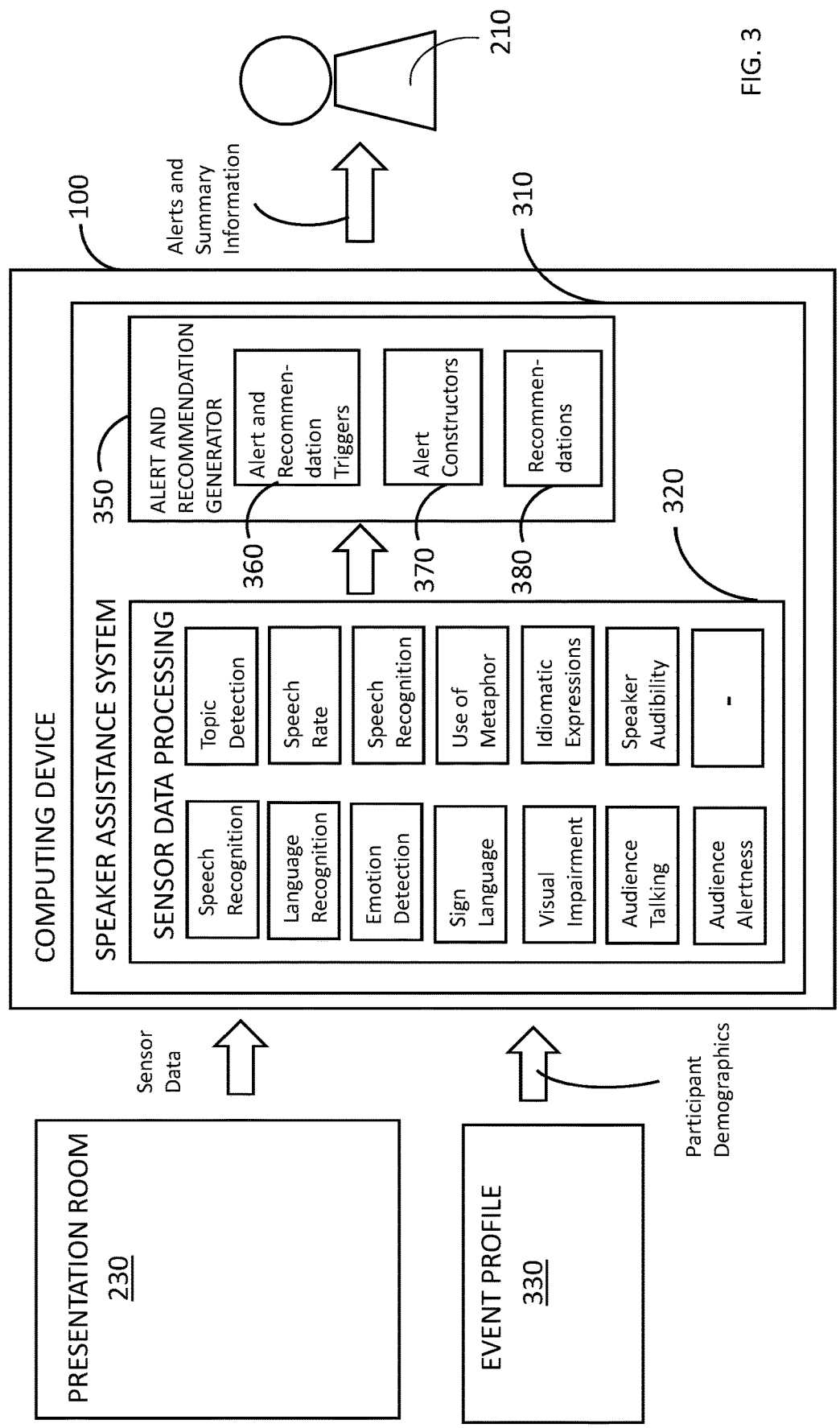
FIG. 3 depicts a block diagram illustrating an exemplary speaker assistance system to implement one or more embodiments of the present invention.

Turning now to FIG. 3, a block diagram of an exemplary speaker assistance system 310 of a computing system 100 for implementing one or more embodiments of the present invention is illustrated. That is, the computing system 100 incorporates the speaker assistance system 310 to implement some examples. In one example, the speaker assistance system 310 may also be implemented as a "smart phone" capable of running one or more applications. In some examples, the speaker assistance system 310 is integrated into the computing system 100, such as an integrated personal digital assistant (PDA) and wireless phone.

Still referring to FIG. 3, the speaker assistance system 310 receives the transmitted data collected by the sensors 240 that are positioned in the room 230. The sensors 240 collect information about the audience such an audience or event profile 330. The audience profile 330 is made up of one or more profiles of the members of the audience and include statistical data or demographics relating to the audience 220 as a group. One or more sensors 240 can detect the profiles of the audience members 250 or, alternatively, the computer system 100 with the speaker assistance system 310 may directly detect the profiles of the audience members 250. A profile of an audience member 250 may include an occupation and/or areas of expertise and other data, for example.

In one or more embodiments, an audience member 250 fills out or completes a registration form in order to attend an event. In such case, the information from a member 250's registration for an event may be used to gather information about the audience member and to obtain or generate a profile for that audience member 250 for a particular event and for other events in the future.

The speaker assistance system 310 of the computer system 100 includes a sensor data processing package 320 for processing the information detected and received from the one or more sensors 240. The sensor data processing package 320 includes multiple software modules that can be loaded or unloaded from the computer system 100 to form the speaker assistance system 310. For example, the sensor data processing package 320 may include a speech recognition module for recognizing the speech of the presenter 210 and a second speech recognition module for recognizing the speech of members 250 of the audience 220. The sensor data processing package 320 may also include a language detection module for detecting languages spoken by the members 250 of the audience 220 and a sign language module for detecting sign language used by audience members 250. The sensor data processing package 320 may also include a visual impairment module for detecting the presence of guide dogs or the use of a white cane. Also, the sensor data processing package 320 may include modules for detecting whether the audience is talking or whether the audience is moving or alert. The sensor data processing package 320 may also include modules for detecting topics of discussion and for detecting emotions of one or more audience members 250.

The sensor data processing package 320 may also include a module for detecting the speech rate of the presenter 210 and a module for detecting audibility level of the presenter. The sensor data processing package 320 may also include modules for detecting when the presenter 210 uses metaphors or idiomatic expressions.

The speaker assistance system 310 of the computer system 100 also includes an alert and recommendation generator 350 for generating alerts and recommendations based on the processing of the information by the sensor data processing package 320. The alert and recommendation generator 350 includes alert and recommendation triggers 360. The triggering for alerts occurs as a result of the information processed by the sensor data processing package 320. Alerts themselves can be created by a user via alert constructors 370 based on the processed information. Recommendations 380 are automatically generated based on the information processed by the sensor data processing package 320. The triggered alerts and the generated recommendations are provided to the dashboard 400 of FIG. 4 for the presenter 210. An alert may be referred to as a recommendation and vice versa.

Figure 4:
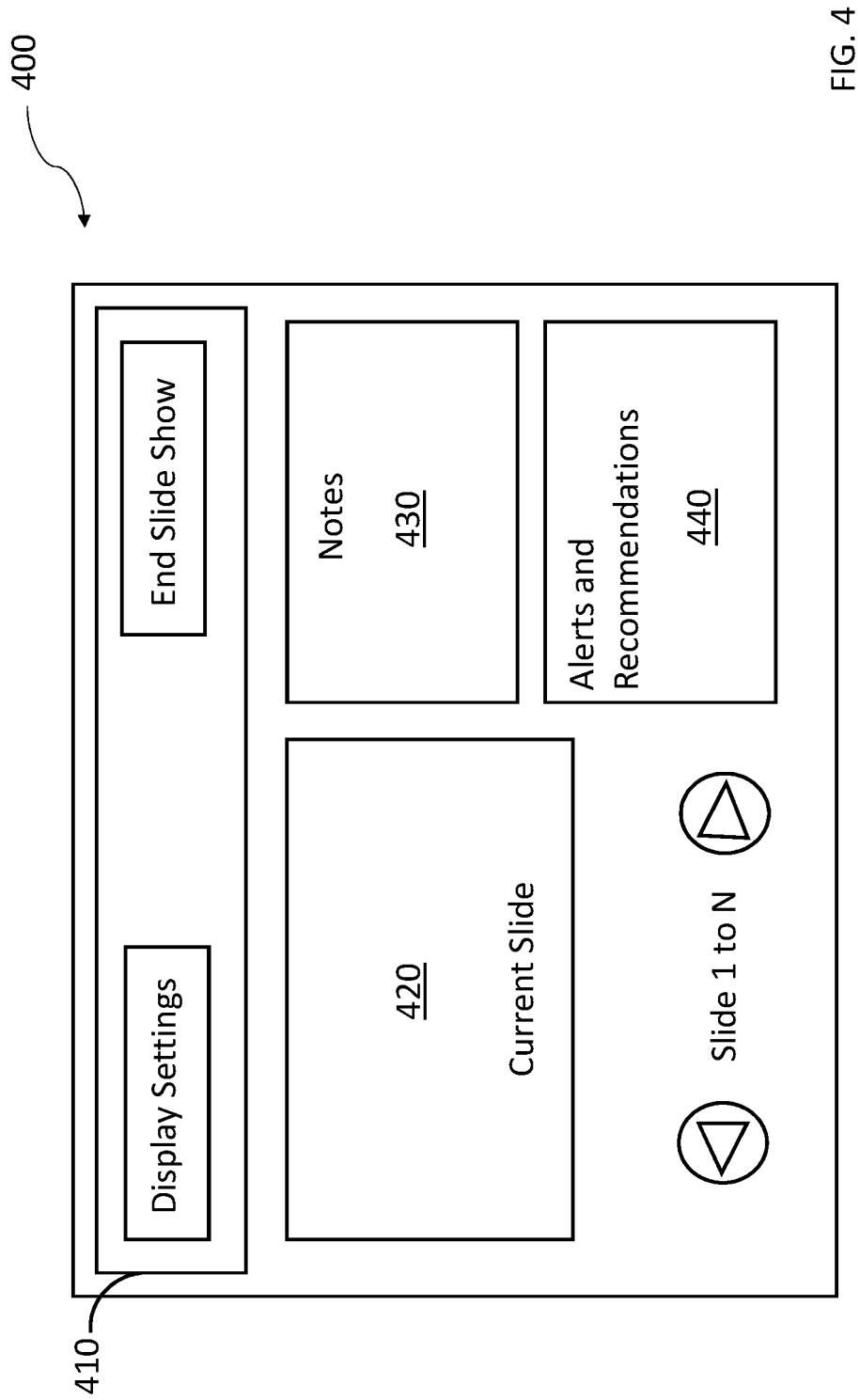
FIG. 4 depicts a dashboard to implement one or more embodiments of the present invention.

FIG. 4 depicts the dashboard 400 for implementing one or more embodiments of the present invention. The dashboard 400 includes a ribbon or toolbar 410 with on-screen buttons, icons, menus or other input or output elements. The dashboard 400 also displays one or more slides or images of a presentation 420 and navigation arrows for navigating the presentation 420. The presenter 210 may also include notes 430 which may be referred to while giving the presentation. The dashboard 400 may also have one or more areas 440 for displaying the alerts and recommendations generated by the alert and recommendation generator 350.

The alerts or recommendations may indicate to the presenter, for example, to slow down while speaking, to pause, to speak up, to engage the audience by asking questions or telling jokes if they are getting restless, to repeat questions, or to verbally describe images, charts or video. The identification of experts, such as an expert in an area related to the topic of the presentation, may also be displayed on the dashboard 400. Audience statistics may also be displayed in the dashboard 400. For example, the audience statistics can include the total number of people in the audience, the accessibility needs of the audience, the distribution of people in the audience based on a profession, or the distribution of people in the audience based on skills or expertise. In one embodiment, an alert or recommendation could identify an expert from the audience in an area related to the presentation.

Figure 5:
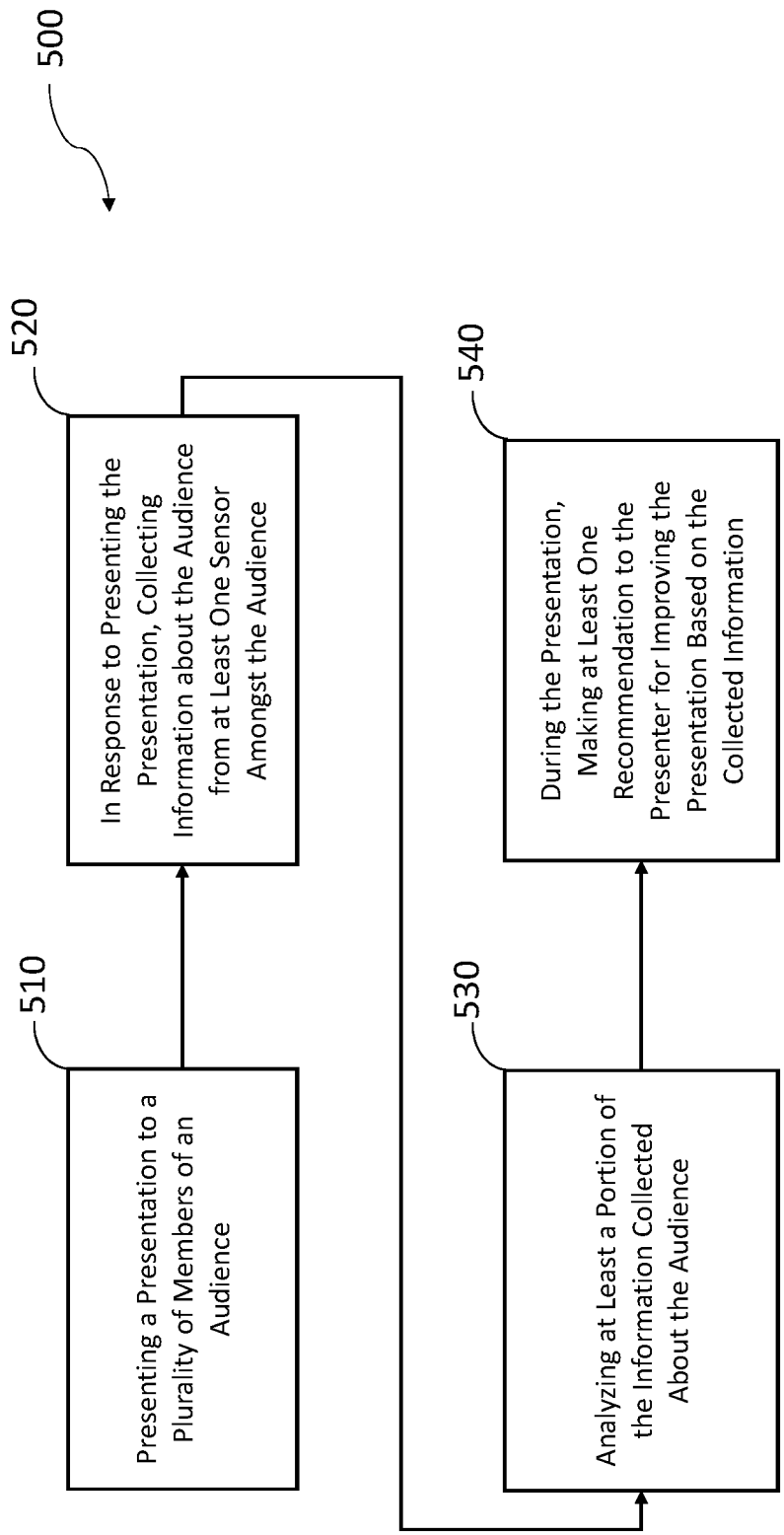
FIG. 5 is a flow diagram illustrating a method for providing real-time awareness to a presenter according to one or more embodiments of the present invention.

Turning to FIG. 5, one or more embodiments may include a method 500 for providing real-time awareness to a presenter. The flow diagram of FIG. 5 illustrates the method 500 that includes process block 510 for presenting a presentation to a plurality of members of an audience and process block 520 for collecting information about the audience from at least one sensor amongst the audience, in response to presenting the presentation. The method 500 also includes process block 530 for analyzing at least a portion of the information collected about the audience and process block 540 for making at least one recommendation to the presenter for improving the presentation based on the collected information during the presentation. The method 500 may also include the presenter adjusting the presentation based on the at least one recommendation. The method 500 may also include where the information collected from at least one sensor about the audience is unsolicited or is collected without the presenter making a request to collect information.

Various technical benefits are achieved using the system and methods described herein, including the capability of providing enhanced performance for applications with exclusive access to the co-processors while also allowing applications that do not need performance access to accelerators when shared access is available. In this manner, the computing device can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing real-time awareness to a presenter, the method comprising:
   presenting a presentation to a plurality of members of an audience;
   in response to presenting the presentation, collecting information about the audience from at least one sensor amongst the audience;
   analyzing at least a portion of the information collected about the audience; and
   during the presentation, making at least one automatically generated recommendation to the presenter for improving the presentation based on the collected information.

2. The method of claim 1 wherein collecting information about the audience from at least one sensor amongst the audience comprises collecting unsolicited information about the audience from at least one sensor amongst the audience.

3. The method of claim 1 wherein collecting information about the audience from at least one sensor amongst the audience comprises collecting information about the audience without the presenter making a request to collect information.

4. The method of claim 1 wherein collecting information about the audience from at least one sensor amongst the audience comprises automatically detecting information about the audience.

5. The method of claim 1 wherein collecting information about the audience from at least one sensor amongst the audience comprises automatically detecting information about an environment where the presentation is being made.

6. The method of claim 1 wherein collecting information about the audience from at least one sensor amongst the audience comprises automatically detecting information about the audience wherein the audience is remote from the presenter.

7. The method of claim 1 wherein collecting information about the audience from at least one sensor amongst the audience comprises automatically detecting an audience profile, wherein the audience profile comprises a profile of at least one member of the audience, a reaction or behavior from at least one member of the audience, and a presentation context wherein the presentation context comprises at least one of: a time of day, a size of a room where the audience is, and a temperature of the room where the audience is.

8. The method of claim 1 wherein making at least one recommendation to the presenter for improving the presentation based on the collected information comprises an alert of at least one of the following:
   slow down,
   pause,
   provide a verbal description,
   speak up,
   engage the audience, and
   repeat a question.

9. The method of claim 1 wherein making at least one recommendation to the presenter for improving the presentation based on the collected information comprises providing an identification of an expert from the audience in an area related to the presentation.

10. The method of claim 1 wherein collecting information about the audience from at least one sensor amongst the audience comprises collecting audience statistics, wherein the audience statistics comprise a total number of members of the audience, accessibility needs in a room receiving the presentation, and descriptions of professions or areas of expertise of members of the audience.

11. The method of claim 1 further comprising the presenter adjusting the presentation based on the at least one recommendation.

12. A system for providing real-time awareness to a presenter, the system comprising:
    a processor coupled to a memory unit, wherein the processor is configured to execute program instructions comprising:
       presenting a presentation to a plurality of members of an audience;
       in response to presenting the presentation, collecting information about the audience from a plurality of sensors positioned amongst the audience;
       analyzing at least a portion of the information collected about the audience;
       during the presentation, making at least one automatically generated recommendation to the presenter for improving the presentation based on the collected information; and adjusting, via the presenter, the presentation based on the at least one recommendation.

13. The system of claim 12 wherein the information collected from the audience is automatically collected and is unsolicited by the presenter.

14. The system of claim 12 wherein the audience is remote from the presenter.

15. The system of claim 12 further comprising a dashboard, wherein the dashboard displays an audience profile, wherein the audience profile comprises individual profiles of a plurality of the members of the audience, a reaction or behavior from at least one member of the audience, and a presentation context, wherein the presentation context comprises a time of day, a size of a room where the audience is, and a temperature of the room where the audience is.

16. The system of claim 12 further comprising a dashboard, wherein the dashboard displays alerts to slow down, pause, speak up and repeat a question.

17. The system of claim 12 further comprising a dashboard, wherein the dashboard displays audience statistics, wherein the audience statistics comprise a total number of members of the audience, accessibility needs in a room receiving the presentation, and descriptions of professions or areas of expertise of members of the audience.

18. A computer program product comprising a computer readable storage medium having program instructions embodied therewith, the program instructions executable by a computer processor to cause the computer processor to perform a method for providing real-time awareness to a presenter, comprising:
   presenting a presentation to a plurality of members of an audience;
   in response to presenting the presentation, collecting information about the audience from at least one sensor amongst the audience;
   analyzing at least a portion of the information collected about the audience;
   during the presentation, making at least one automatically generated recommendation to the presenter for improving the presentation based on the collected information; and
   adjusting the presentation based on the at least one recommendation.

19. The computer program product of claim 18 wherein collecting information about the audience from at least one sensor amongst the audience comprises automatically detecting an audience profile, wherein the audience profile comprises a profile of at least one member of the audience, a reaction or behavior from at least one member of the audience, and a presentation context wherein the presentation context comprises a time of day, a size of a room where the audience is, and a temperature of the room where the audience is, and wherein collecting information about the audience from at least one sensor amongst the audience further comprises collecting a total number of members of the audience, accessibility needs in a room receiving the presentation, and descriptions of professions or areas of expertise of members of the audience.

20. The computer program product of claim 18 wherein making at least one recommendation to the presenter for improving the presentation based on the collected information comprising a dashboard displaying alerts to slow down, pause, speak up and repeat a question.

* * * * *